(12) United States Patent
DiBenedetto et al.

(10) Patent No.: US 11,131,195 B2
(45) Date of Patent: Sep. 28, 2021

(54) TIE SHAFT ASSEMBLY FOR A GAS TURBINE ENGINE

(71) Applicant: United Technologies Corporation, Farmington, CT (US)

(72) Inventors: Enzo DiBenedetto, Berlin, CT (US); Griffin D. Lavine, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 256 days.

(21) Appl. No.: 16/353,182

(22) Filed: Mar. 14, 2019

(65) Prior Publication Data
US 2020/0291781 A1 Sep. 17, 2020

(51) Int. Cl.
| F01D 5/06 | (2006.01) |
| F01D 5/02 | (2006.01) |
| B21D 39/00 | (2006.01) |

(52) U.S. Cl.
CPC ............ *F01D 5/066* (2013.01); *B21D 39/00* (2013.01); *F01D 5/026* (2013.01); *B23P 2700/13* (2013.01); *F05D 2230/60* (2013.01); *F05D 2240/60* (2013.01); *F05D 2240/61* (2013.01); *F05D 2260/30* (2013.01); *F05D 2260/31* (2013.01); *F05D 2260/38* (2013.01); *Y10T 29/4932* (2015.01); *Y10T 29/49963* (2015.01)

(58) Field of Classification Search
CPC ...... F01D 5/066; F01D 5/026; F05D 2260/38; F05D 2260/31; F05D 2260/30; F05D 2240/60; F05D 2240/61; F05D 2230/60; F05D 2230/64; B21D 39/00; B23P 2700/13; B23P 15/008; Y10T 29/4932; Y10T 29/49963
See application file for complete search history.

(56) References Cited

U.S. PATENT DOCUMENTS

| 5,537,814 | A | 7/1996 | Nastuk et al. |
| 8,794,923 | B2 * | 8/2014 | Tirone, III ............ F01D 5/026 416/198 A |
| 8,794,932 | B2 | 8/2014 | Rogers et al. |
| 2007/0286733 | A1 | 12/2007 | Bouchard |
| 2016/0290323 | A1 * | 10/2016 | Cassanelli ............ B64G 1/222 |
| 2018/0094544 | A1 | 4/2018 | Waslo |

FOREIGN PATENT DOCUMENTS

| EP | 2447471 | 5/2012 |
| WO | 2007051443 | 5/2007 |
| WO | WO2014037521 | 3/2014 |

OTHER PUBLICATIONS

English machine translation of WO 2007/051443 A1, Jan. 16, 2021.*
EP Search Report for EP Application No. 20163038.1 dated Jun. 4, 2020.

* cited by examiner

*Primary Examiner* — Christopher Verdier
(74) *Attorney, Agent, or Firm* — Carlson, Gaskey & Olds, P.C.

(57) ABSTRACT

A tie shaft assembly for a gas turbine engine includes a compressor tie shaft that has an upstream end and a downstream end. The downstream end includes a radially outer threaded surface and a radially inner threaded surface. A turbine tie shaft has an upstream end with a radially outer threaded surface in engagement with the radially inner threaded surface on the compressor tie shaft.

14 Claims, 4 Drawing Sheets

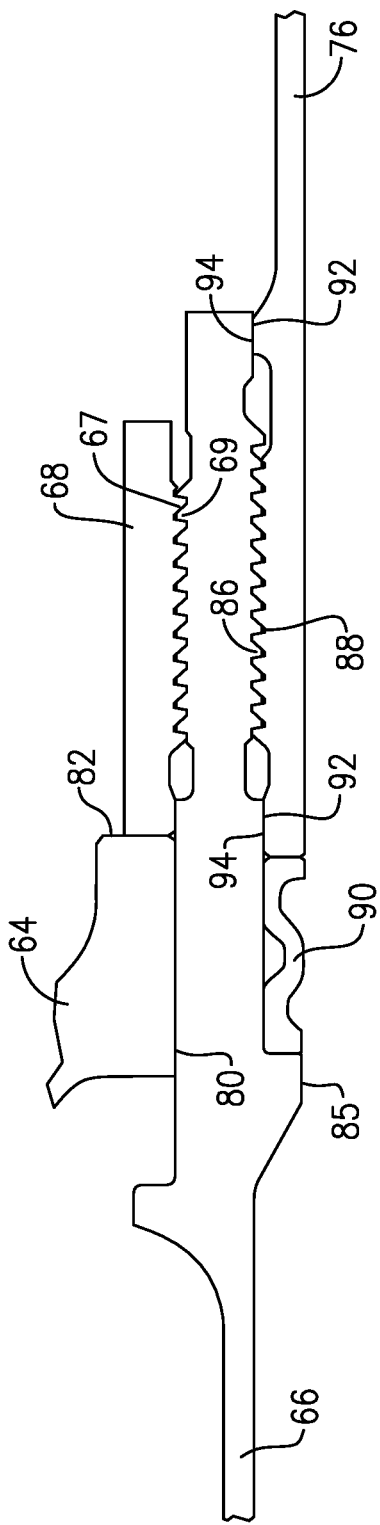
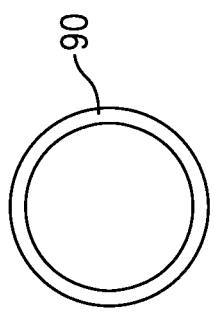
FIG.5
FIG.6

TIE SHAFT ASSEMBLY FOR A GAS TURBINE ENGINE

BACKGROUND

This application relates to a method of assembling a gas turbine engine, wherein both a compressor and a turbine in a spool are assembled using a tie shaft connection.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Typically, the compressor section is provided with a plurality of rotor sections. Traditionally, these stages were joined sequentially one to another into an inseparable assembly by welding or separable assembly by bolting using bolt flanges, or other structure to receive the attachment bolts. A tie shaft allows the compressor section to be assembled without welding or fastening the stages together.

SUMMARY

In one exemplary embodiment, a tie shaft assembly for a gas turbine engine includes a compressor tie shaft that has an upstream end and a downstream end. The downstream end includes a radially outer threaded surface and a radially inner threaded surface. A turbine tie shaft has an upstream end with a radially outer threaded surface in engagement with the radially inner threaded surface on the compressor tie shaft.

In a further embodiment of the above, a preload spring is in engagement with the compressor tie shaft and the turbine tie shaft. A spanner nut includes a spanner threaded surface that engages the radially outer threaded surface on the compressor tie shaft.

In a further embodiment of any of the above, the preload spring engages a radially inward extending projection on the compressor tie shaft and an axially forward edge of the turbine tie shaft.

In a further embodiment of any of the above, the preload spring forms a complete loop.

In a further embodiment of any of the above, the preload spring includes at least one undulation.

In a further embodiment of any of the above, the radially outer threaded surface and the radially inner threaded surface on the compressor tie shaft are at least partially axially aligned.

In a further embodiment of any of the above, a radially outer surface of the compressor tie shaft includes a compressor hub contact surface. An axially forward edge of the spanner nut includes a compressor hub contact surface.

In a further embodiment of any of the above, a compressor section has a plurality of compressor stages held in compression by the compressor tie shaft. A turbine section is bolted to the compressor section.

In a further embodiment of any of the above, the compressor tie shaft is at least partially axially aligned with the compressor section. The turbine tie shaft is located downstream of the compressor tie shaft and is at least partially axially aligned with the turbine section.

In another exemplary embodiment, a gas turbine engine includes a compressor section that includes a plurality of compressor stages. A turbine section includes at least one turbine stage. A tie shaft assembly includes a compressor tie shaft for compressing the plurality of compressor stages and has an upstream end and a downstream end. The downstream end includes a radially outer threaded surface and a radially inner threaded surface. A turbine tie shaft has an upstream end that has a radially outer threaded surface in engagement with the radially inner threaded surface on the compressor tie shaft.

In a further embodiment of any of the above, a preload spring is in engagement with the compressor tie shaft and the turbine tie shaft. A spanner nut includes a spanner threaded surface that engages the radially outer threaded surface on the compressor tie shaft.

In a further embodiment of any of the above, the preload spring engages a radially inward extending projection on the compressor tie shaft.

In a further embodiment of any of the above, the radially outer threaded surface and the radially inner threaded surface on the compressor tie shaft are at least partially axially aligned.

In a further embodiment of any of the above, a radially outer surface of the compressor tie shaft includes a compressor hub contact surface and an axially forward edge of the spanner nut includes a compressor hub contact surface.

In a further embodiment of any of the above, the turbine section is bolted to an aft compressor hub in the compressor section.

In a further embodiment of any of the above, the compressor tie shaft is at least partially axially aligned with the compressor section. The turbine tie shaft is located downstream of the compressor tie shaft and at least partially axially aligned with the turbine section.

In another exemplary embodiment, a method of assembly of a spool for a gas turbine engine includes aligning a plurality of compressor stages in an axial row and compressing the plurality of compressor stages with a compressor tie shaft. A downstream end of the compressor tie shaft includes a radially outer threaded surface and a radially inner threaded surface. The plurality of compressor stages are compressed with a spanner nut that engages the radially outer threaded surface on the compressor tie shaft. The radially inner threaded connection is engaged on the compressor tie shaft with a threaded surface of a turbine tie shaft.

In a further embodiment of any of the above, the plurality of compressor stages is located axially downstream of a forward compressor hub and axially upstream of a downstream compressor hub. The compressor tie shaft engages the forward compressor hub and the aft compressor hub.

In a further embodiment of any of the above, the downstream compressor hub is bolted to a turbine section.

In a further embodiment of any of the above, a preload spring is engaged with the turbine tie shaft.

BRIEF DESCRIPTION OF THE DRAWINGS

FIG. 5 illustrates an enlarged view of assembled tie shaft assembly.

FIG. 6 illustrates an axial view of a preload spring.

DETAILED DESCRIPTION

Figure 1:
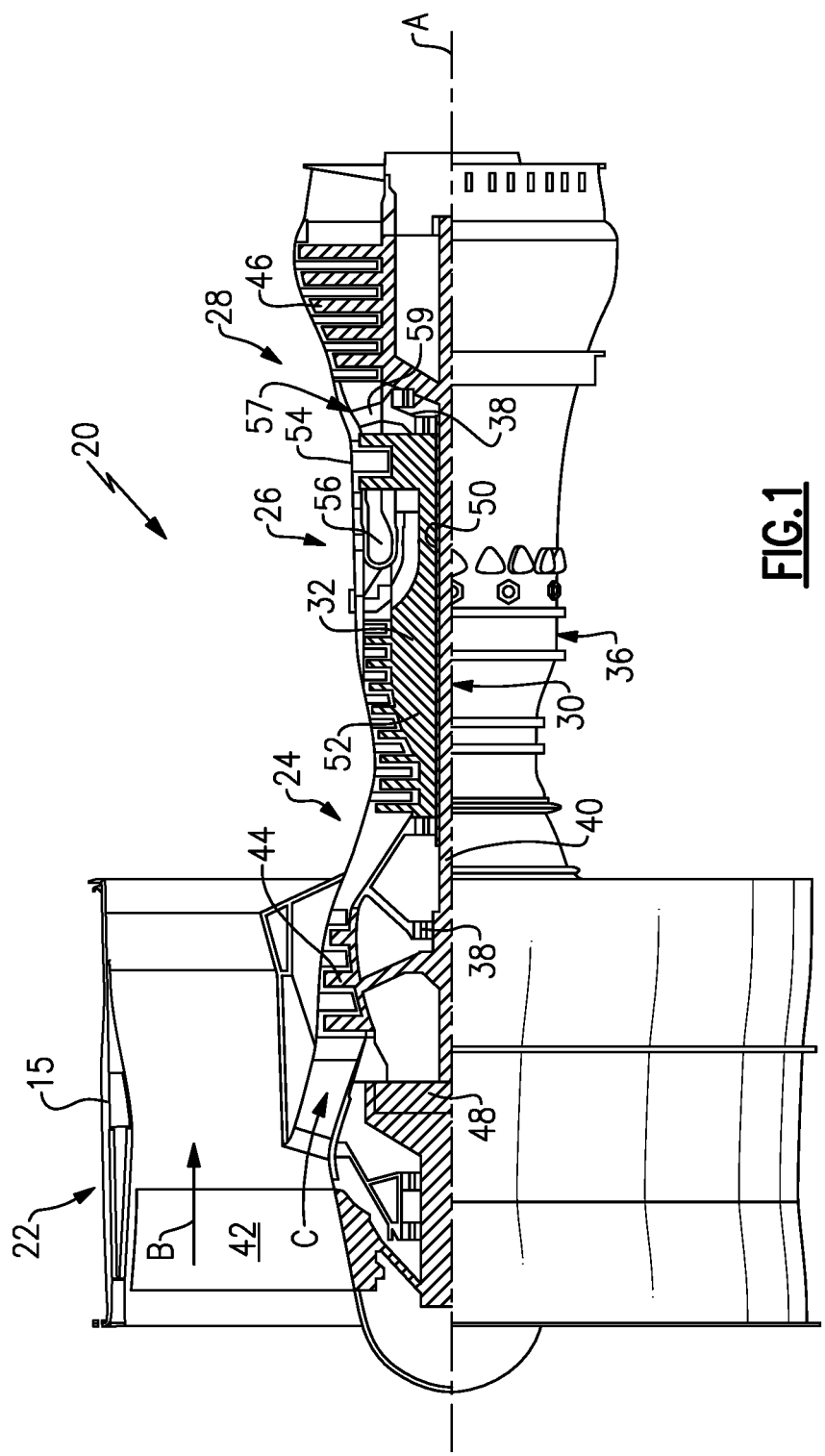
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
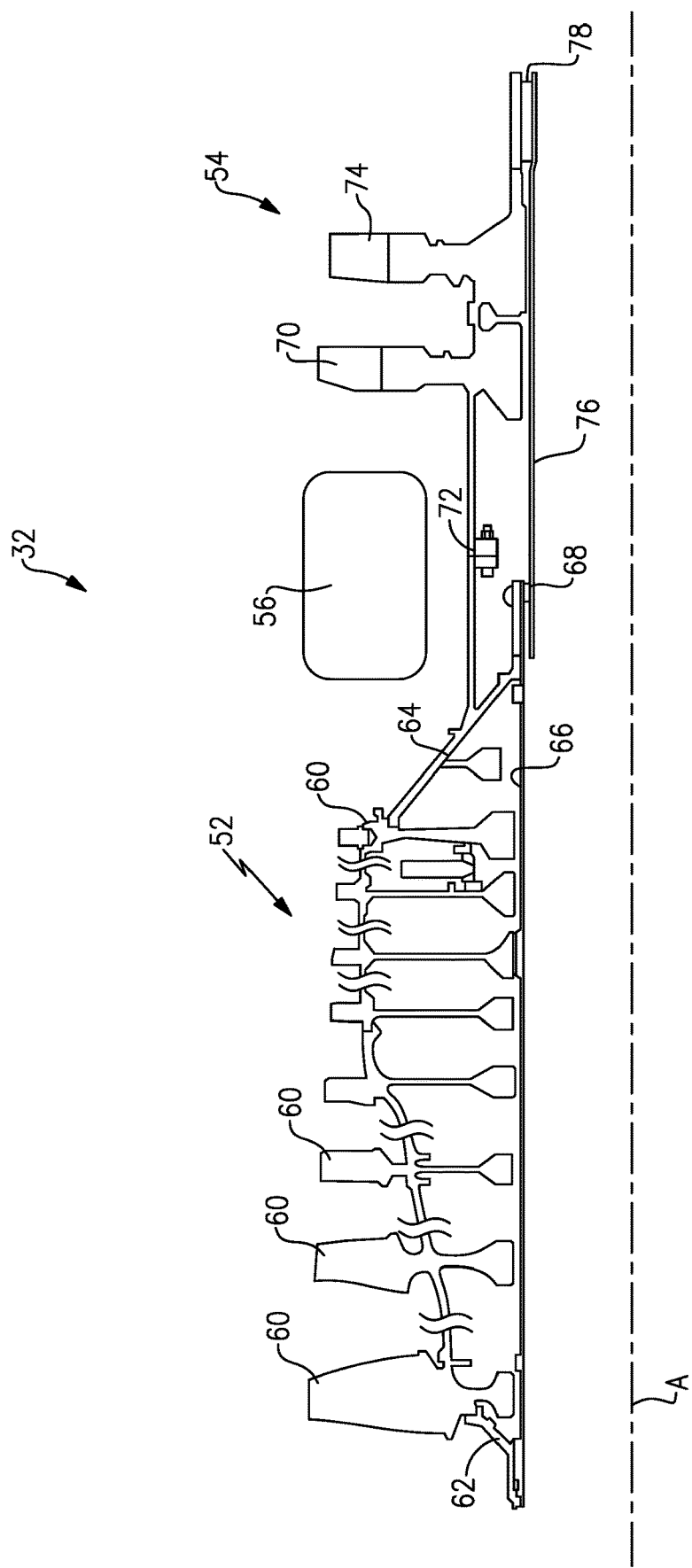
FIG. 2 illustrates an example high speed spool.

FIG. 2 illustrates the high speed spool 32 with the high pressure compressor 52 and the high pressure turbine 54. The high pressure compressor 52 includes a plurality of compressor rotors 60 located between a forward compressor hub 62 and an aft compressor hub 64. A high pressure compressor ("HPC") tie shaft 66 engages the forward compressor hub 62 and the aft compressor hub 64. A high pressure turbine ("HPT") tie shaft 76 engages the HPC tie shaft 66 and secures the high pressure turbine 54 relative to the high pressure compressor 52.

In the illustrated example, a spanner nut 68 surrounds and engages an axially downstream end of the HPC tie shaft 66 to compress the plurality of compressor rotors 60 between the forward compressor hub 62 and the aft compressor hub 64. This configuration of joining the compressor rotors 60 and the compressor hubs 62, 64 does not require each individual rotor stage or groups of rotor stages to be jointed together with bolts or welding. By eliminating the need for additional fastening of the compressor rotors 60, the complexity and time for assembling the compressor section 52 is greatly reduced. In this disclosure, axial or axially and radial or radially is with respect to the engine axis A unless stated otherwise.

The high pressure turbine 54 includes a forward turbine rotor 70 that is mechanically fixed to the aft compressor hub 64 through a plurality of bolts 72 (only one shown). In the illustrated example, the high pressure turbine 54 also includes an aft or second turbine rotor 74. However, the high pressure turbine 54 could include only one rotor or more than two rotors. The forward and aft turbine rotors 70, 74 are at least partially compressed together and secured to the HPC tie shaft 66 with the HPT tie shaft 76. The HPT tie shaft 76 is separate from the HPC tie shaft 66. The HPT tie shaft 76 engages a radially inner side of the HPC tie shaft 66 at an axially upstream end and engages a lock nut 78 at an axially downstream end to secure the forward and aft turbine rotors 70, 74 relative to the HPT tie shaft 76.

Figure 3:
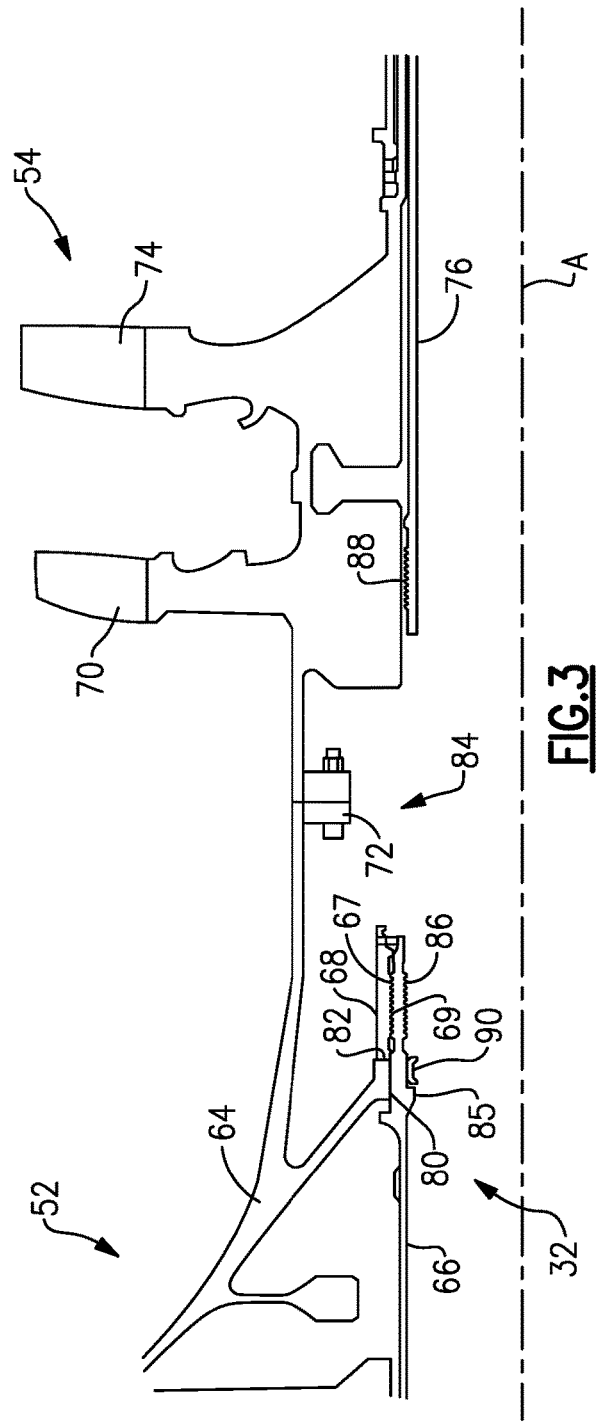
FIG. 3 illustrates an example partially assembled tie shaft assembly for the high speed spool of FIG. 2.

FIG. 3 illustrates an enlarged view of the spanner nut 68 secured to the HPC tie shaft 66 prior to attaching the HPT tie shaft 76 to the HPC tie shaft 66. As shown in FIG. 3, the aft compressor hub 64 includes a downstream end having a tie shaft contact surface 80 for contacting the HPC tie shaft 66 and a spanner nut contact surface 82 for contacting the spanner nut 68.

The spanner nut 68 engages the spanner nut contact surface 82 on the aft compressor hub 64 to provide the compressive force to secure the plurality of compressor rotors 60 together in the high pressure compressor 52. The spanner nut 68 also includes a threaded surface 67 on a radially inner side that is in direct threaded engagement with a corresponding threaded surface 69 on a radially outer surface of the downstream end of the HPC tie shaft 66. In the illustrated example, the threaded surfaces 67 and 69 define a buttress thread, but other types of threads could be used.

After the spanner nut 68 is secured to the HPC tie shaft 66, the high pressure turbine 54 can be connected to the high pressure compressor 52 with the plurality of bolts 72. The high pressure turbine 54 and the high pressure compressor 52 are able to be secured to each other with the bolts 72 because the HPC tie shaft 66 and the HPT tie shaft 76 are separate pieces. By having a two piece tie shaft, an access passage 84 is created axially downstream of the HPC tie shaft 66 and upstream of the forward turbine rotor 70 in the high pressure turbine 54. The access passage 84 allows a tool to access the area of a mechanical fastener, such as the bolts 72, to secure the aft compressor hub 64 to the forward turbine rotor 70. Additionally, using a bolted or other type of mechanical connection between the high pressure turbine 54 and the high pressure compressor 52 allows the ability to replace other torque transmission methods such as a Curvic coupling, friction type coupling, or an interdigitated coupling.

Figure 4:
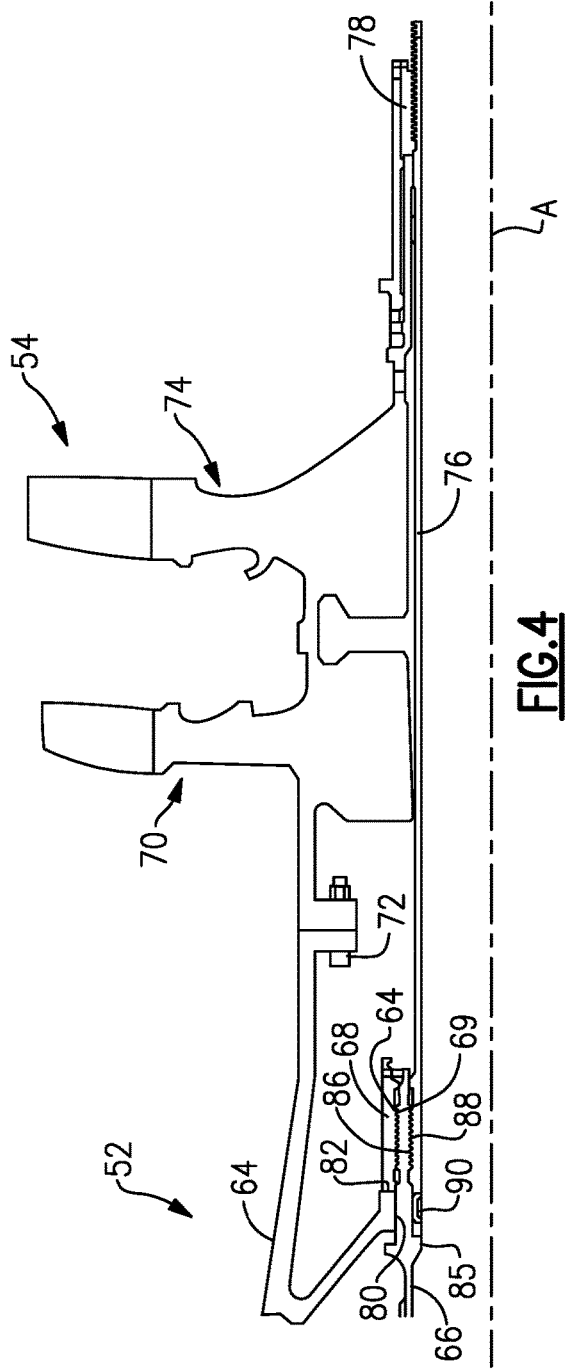
FIG. 4 illustrates an assembled tie shaft assembly for the high speed spool of FIG. 2.

Prior to installing the HPT tie shaft 76, a spring 90 is placed on a radially inner side of the HPC tie shaft 66 and axially against a protrusion 85 on the HPC tie shaft 66 as shown in FIGS. 4-5. An upstream end of the spring 90 directly engages the protrusion 8 and a downstream most end of the spring 90 directly engages an axially forwardmost edge of an upstream end of the HPT tie shaft 76. In the illustrated example, the spring 90 forms a complete loop (FIG. 6) and includes at least one undulation axially between a forward edge and an aft edge of the spring 90.

Once the spring 90 is in place and the aft compressor hub 64 is secured to the forward turbine rotor 70, the HPT tie shaft 76 is moved axially forward while being located radially within the high pressure turbine 54. The HPT tie shaft 76 includes a threaded surface 88 at an axially forward end that is in direct threaded engagement with a threaded surface 86 on a radially inner side of an aft end of the HPC tie shaft 66. The spring 90 is located radially inward of the direct threaded engagement of the threaded surfaces 86 and 88 as shown in FIG. 5. In the illustrated example, the threaded surfaces 86 and 88 define buttress threads, but other types of threads could be used. Additionally, the HPC tie shaft 66 includes pilot surfaces 92 upstream and downstream of the threaded surface 86 that engage corresponding pilot surfaces 94 upstream and downstream of the threaded surface 88 on the HPT tie shaft 76. The pilot surfaces 92 and 94 contain close tolerances to maintain the HPT tie shaft 76 centerline in line with the HPC tie shaft 66 centerline.

The spring 90 allows the HPT tie shaft 76 to be sufficiently tightened relative to the HPC tie shaft 66 without the risk of galling resulting between the HPT tie shaft 76 and the HPC tie shaft 66, while also allowing positive clamping load throughout the engine mission.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A tie shaft assembly for a gas turbine engine comprising:
   a compressor tie shaft having an upstream end and a downstream end and the downstream end includes a radially outer threaded surface and a radially inner threaded surface;
   a turbine tie shaft having an upstream end with a radially outer threaded surface in direct threaded engagement with the radially inner threaded surface on the compressor tie shaft; and
   a preload spring in engagement with the compressor tie shaft and the turbine tie shaft and a spanner not including a spanner threaded surface in directed threaded engagement with the radially outer threaded surface on the compressor tie shaft and the preload spring is located radially inward relative to the direct threaded engagement between the radially inner threaded surface and the radially outer threaded surface, wherein the preload spring is located upstream of an axially forwardmost edge of the upstream end of the turbine tie shaft.

2. The assembly of claim 1, wherein an upstream end of the preload spring directly engages a radially inward extending projection on the compressor tie shaft and a downstream most end of the preload spring directly engages the axially forwardmost edge on the upstream end of the turbine tie shaft.

3. The assembly of claim 1, wherein the preload spring forms a complete loop and the preload spring is axially spaced from the radially inner threaded surface and the radially outer threaded surface.

4. The assembly of claim 1, wherein the preload spring includes at least one undulation and the preload spring is located radially inward from the compressor tie shaft.

5. The assembly of claim 1, wherein the radially outer threaded surface and the radially inner threaded surface on the compressor tie shaft are at least partially axially aligned.

6. The assembly of claim 1, wherein a radially outer surface of the compressor tie shaft includes a compressor hub contact surface and an axially forward edge of the spanner nut includes a compressor hub contact surface.

7. The assembly of claim 1, further comprising a compressor section having a plurality of compressor stages held in compression by the compressor tie shaft and a turbine section bolted to the compressor section.

8. The assembly of claim 7, wherein the compressor tie shaft is at least partially axially aligned with the compressor section and the turbine tie shaft is located downstream of the compressor tie shaft and at least partially axially aligned with the turbine section.

9. A gas turbine engine comprising:
   a compressor section including a plurality of compressor stages;
   a turbine section including at least one turbine stage; and
   a tie shaft assembly including:
      a compressor tie shaft for compressing the plurality of compressor stages and having an upstream end and a downstream end and the downstream end includes a radially outer threaded surface and a radially inner threaded surface;

a turbine tie shaft having an upstream end having a radially outer threaded surface in direct threaded engagement with the radially inner threaded surface on the compressor tie shaft; and a preload spring in engagement with the compressor tie shaft and the turbine tie shaft and a spanner nut including a spanner threaded surface that engages the radially outer threaded surface on the compressor tie shaft and the preload spring is located radially inward from the direct threaded engagement between the radially inner threaded surface and the radially outer threaded surface, wherein an upstream end of the preload spring directly engages a radially inward extending projection on the compressor tie shaft and a downstream end of the preload spring directly engages an axially forwardmost edge on the upstream end of the turbine tie shaft.

10. The gas turbine engine of claim 9, wherein the radially outer threaded surface and the radially inner threaded surface on the compressor tie shaft are at least partially axially aligned and the preload spring is axially spaced from the radially inner thread surface and the radially outer threaded surface.

11. The gas turbine engine of claim 10, wherein a radially outer surface of the compressor tie shaft includes a compressor hub contact surface and an axially forward edge of the spanner nut includes a compressor hub contact surface and the turbine section is bolted to an aft compressor hub in the compressor section.

12. The gas turbine engine of claim 9, wherein the compressor tie shaft is at least partially axially aligned with the compressor section and the turbine tie shaft is located downstream of the compressor tie shaft and at least partially axially aligned with the turbine section and the preload spring is located upstream of the axially forwardmost edge on the upstream end of the turbine tie shaft.

13. A method of assembling a spool for a gas turbine engine comprising:

aligning a plurality of compressor stages in an axial row;

compressing the plurality of compressor stages with a compressor tie shaft, wherein a downstream end of the compressor tie shaft includes a radially outer threaded surface and a radially inner threaded surface;

compressing the plurality of compressor stages with a spanner nut that engages the radially outer threaded surface on the compressor tie shaft;

engaging the radially inner threaded surface on the compressor tie shaft in direct threaded engagement with a threaded surface of a turbine tie shaft; and engaging a spring with the turbine tie shaft and the preload spring is located radially inward from the direct threaded engagement between the radially outer threaded surface and the radially inner threaded surface, wherein the preload spring is located upstream of an axially forwardmost edge on the upstream end of the turbine tie shaft.

14. The method of claim 13, further comprising locating the plurality of compressor stages axially downstream of a forward compressor hub and axially upstream of a downstream compressor hub, wherein the compressor tie shaft engages the forward compressor hub and the aft compressor hub and the downstream compressor hub is bolted to a turbine section.

* * * * *